(12) United States Patent
Yen

(10) Patent No.: US 9,394,007 B2
(45) Date of Patent: Jul. 19, 2016

(54) FENDER FLARE

(71) Applicant: Tai-Hsien Yen, Katy, TX (US)

(72) Inventor: Tai-Hsien Yen, Katy, TX (US)

(*) Notice: Subject to any disclaimer, the term of this patent is extended or adjusted under 35 U.S.C. 154(b) by 0 days.

(21) Appl. No.: 14/068,039

(22) Filed: Oct. 31, 2013

(65) Prior Publication Data

US 2014/0125046 A1    May 8, 2014

Related U.S. Application Data

(60) Provisional application No. 61/720,407, filed on Oct. 31, 2012.

(51) Int. Cl.
*B62D 25/18* (2006.01)
*B62D 25/16* (2006.01)
*B60R 13/08* (2006.01)

(52) U.S. Cl.
CPC .......... *B62D 25/161* (2013.01); *B60R 13/0861* (2013.01)

(58) Field of Classification Search
USPC .......................................... 280/851, 847, 848
See application file for complete search history.

(56) References Cited

U.S. PATENT DOCUMENTS

| | | | | | |
|---|---|---|---|---|---|
| 3,341,222 | A | * | 9/1967 | Roberts | 280/851 |
| 3,834,732 | A | * | 9/1974 | Schons | 280/851 |
| 3,899,192 | A | * | 8/1975 | Reddaway | 280/851 |
| 4,205,861 | A | * | 6/1980 | Roberts et al. | 280/851 |
| 4,290,619 | A | * | 9/1981 | Goodall | 280/851 |
| 4,334,694 | A | * | 6/1982 | Iwanicki | 280/851 |
| 4,427,208 | A | * | 1/1984 | Jurges | 280/848 |
| 4,436,319 | A | * | 3/1984 | Clutter | 280/851 |
| 5,100,177 | A | * | 3/1992 | Becker | 280/851 |
| 5,207,455 | A | * | 5/1993 | Gotz et al. | 280/848 |
| 5,326,135 | A | * | 7/1994 | Nakayama et al. | 280/850 |
| 5,460,411 | A | * | 10/1995 | Becker | 280/851 |
| 5,697,644 | A | * | 12/1997 | Logan et al. | 280/848 |
| 5,961,148 | A | * | 10/1999 | Cheng | 280/851 |
| 6,799,782 | B2 | * | 10/2004 | Jain et al. | 280/848 |
| 6,910,788 | B2 | * | 6/2005 | Jones | 362/506 |
| 7,419,188 | B2 | * | 9/2008 | Nicolai et al. | 280/847 |
| 8,276,971 | B2 | * | 10/2012 | Hirano | 296/180.1 |
| 8,608,203 | B2 | * | 12/2013 | Downes et al. | 280/851 |
| 2004/0080185 | A1 | * | 4/2004 | Loddo | 296/198 |
| 2004/0264207 | A1 | * | 12/2004 | Jones | 362/500 |
| 2014/0070523 | A1 | * | 3/2014 | Shih | 280/851 |
| 2014/0125046 | A1 | * | 5/2014 | Yen | 280/851 |

* cited by examiner

*Primary Examiner* — Jeffrey J Restifo
(74) *Attorney, Agent, or Firm* — Patent Law Group LLP; David C. Hsia

(57) ABSTRACT

A fender flare includes a side portion and an inner portion. The inner portion includes troughs at a front area of the inner portion.

9 Claims, 5 Drawing Sheets

FENDER FLARE

CROSS REFERENCE TO RELATED APPLICATION

This application claims priority to U.S. Provisional Patent Application No. 61/720,407, filed Oct. 31, 2012, which is incorporated by reference in its entirety.

BACKGROUND

Fender is a part of an automobile, motorcycle or other vehicle body that frames a wheel well. A fender flare may be added to the fender to accommodate a larger wheel and tire combination in the fender or simply accentuate the fender. A mud flap may be used in combination with the fender to protect the vehicle from mud and other flying debris thrown into the air by the rotating tire. It is typically made from a flexible material such as rubber that is not easily damaged by contact with flying debris, the tire, or the road surface.

BRIEF DESCRIPTION OF THE DRAWINGS

In the drawings.

Use of the same reference numbers in different figures indicates similar or identical elements.

DETAILED DESCRIPTION

Figure 1:
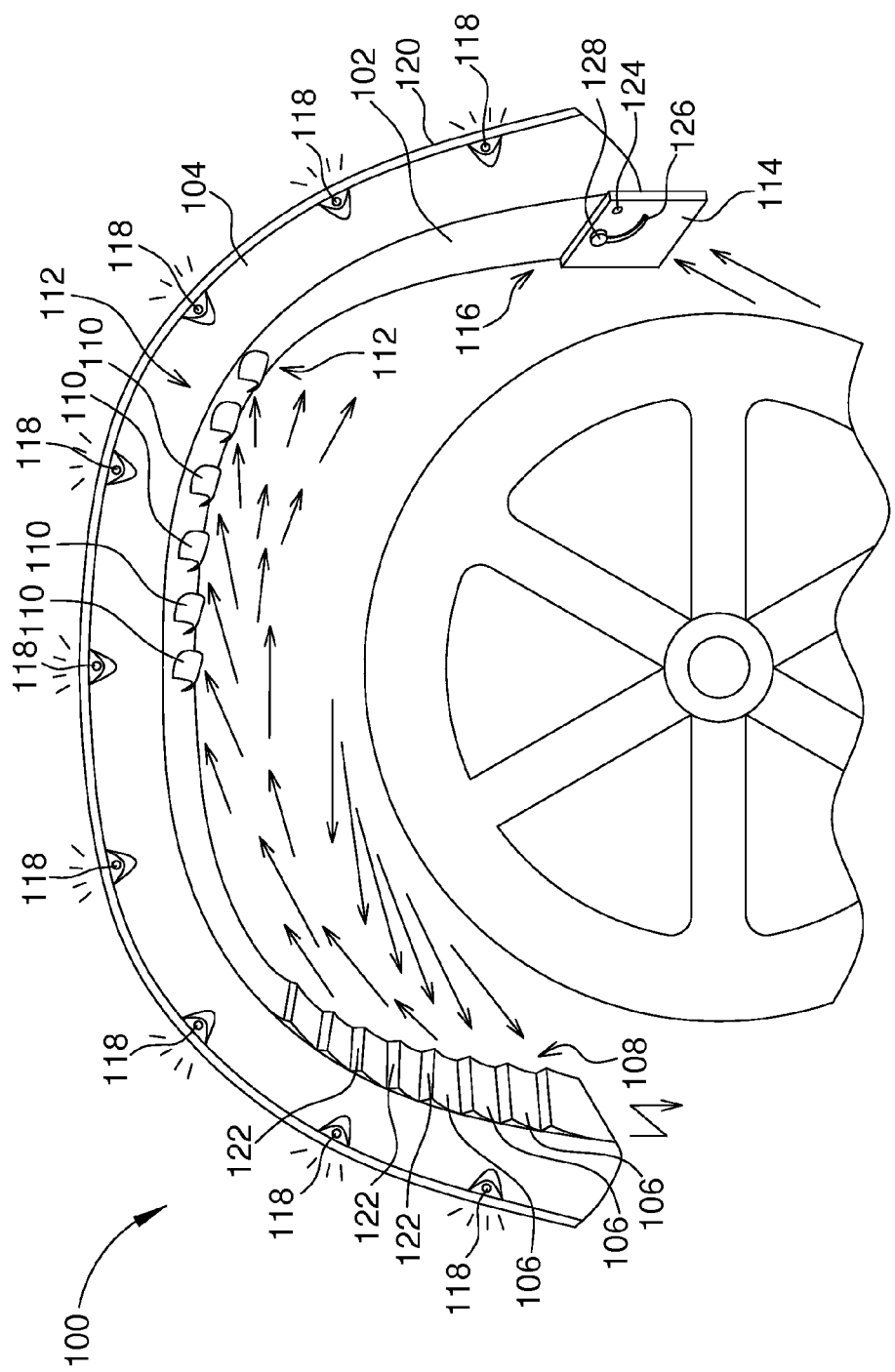
FIG. 1 illustrates a fender flare in one example of the present disclosure.

FIG. 1 illustrates a fender flare in 100 one example of the present disclosure. Fender flare 100 may be an original feature or an aftermarket accessory of a vehicle. Fender flare 100 is fastened to a fender and has a shape that follows the form of a wheel well. For example, fender flare 100 has a semicircular or U-shape. Fender flare 100 has an interior portion 102 that is substantially parallel to the wheel well (e.g., 0 to 30 degrees), and an exterior side 104 that is substantially parallel to the side of the fender (e.g., 0 to 30 degrees).

Interior portion 102 has troughs 106 (only some are labeled) along on a front area 108, gutters 110 (only some are labeled) along a top area 112, a retractable mud flap 114 on a back area 116. Exterior portion 104 has lights 118 along a top perimeter 120. Lights 118 may be yellow LED lights.

Figure 2:
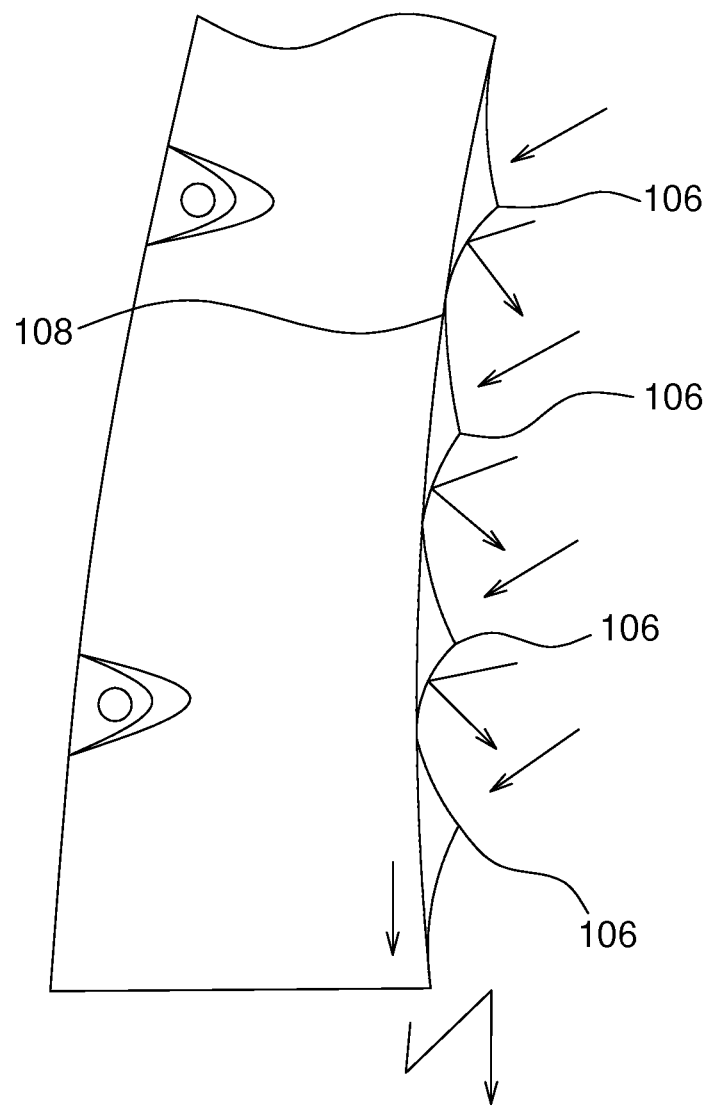
FIG. 2 illustrates troughs of the fender flare in FIG. 1 in one example of the present disclosure.

Referring to FIGS. 1 and 2, troughs 106 are stacked wedges-shaped pockets in one example of the present disclosure. Each trough 106 has a top opening 122 (only some are labeled in FIG. 1), and each trough is orientated diagonally downward towards the inside of the wheel well. The rotating tire throws water towards front area 108, which enter openings 122 and drain along the inside of fender flare 100. As troughs 106 are slanted, the water drains inward towards the vehicle.

Figure 3:
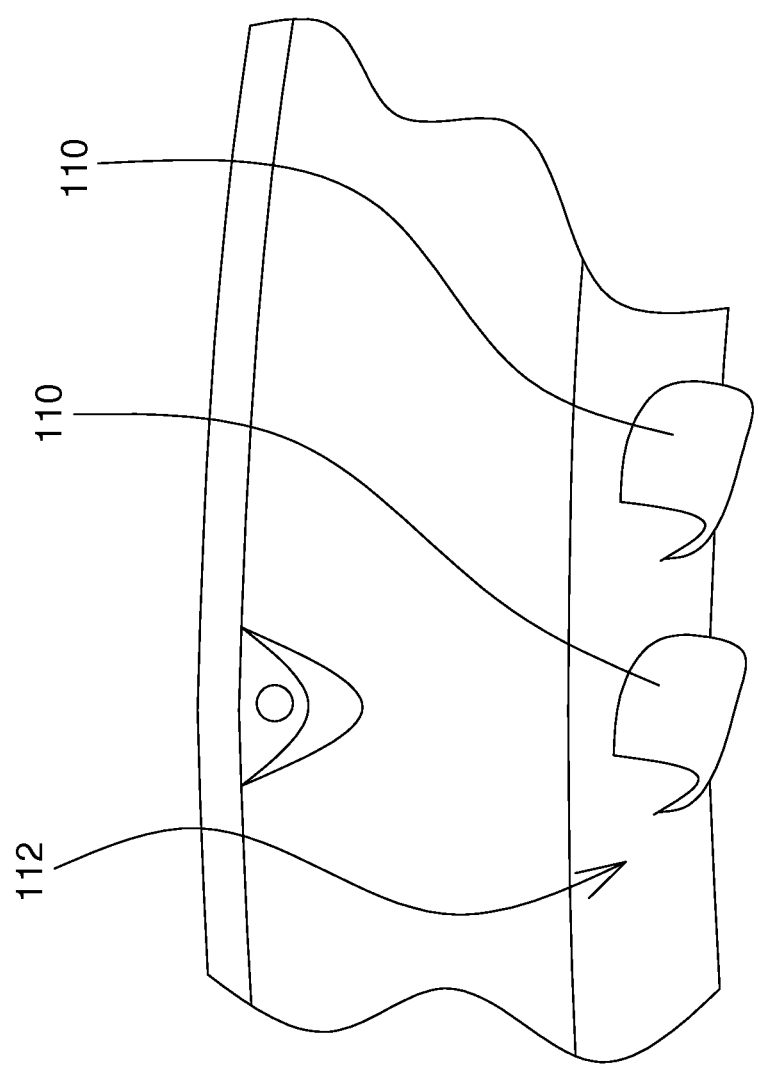
FIG. 3 illustrates gutters of the fender flare in FIG. 1 in one example of the present disclosure.

Referring to FIGS. 1 and 3, gutters 110 are spaced out J-shaped channels in one example of the present disclosure. Each gutter 110 has an open front end, an open interior side, and an open back end. From its front to its back, each gutter 110 is oriented diagonally inward towards the inside of the wheel well. Water that bounces off front area 108 towards top area 112 enter gutters 110. As gutters 110 are slanted, the water drains inward towards the vehicle.

Figure 4:
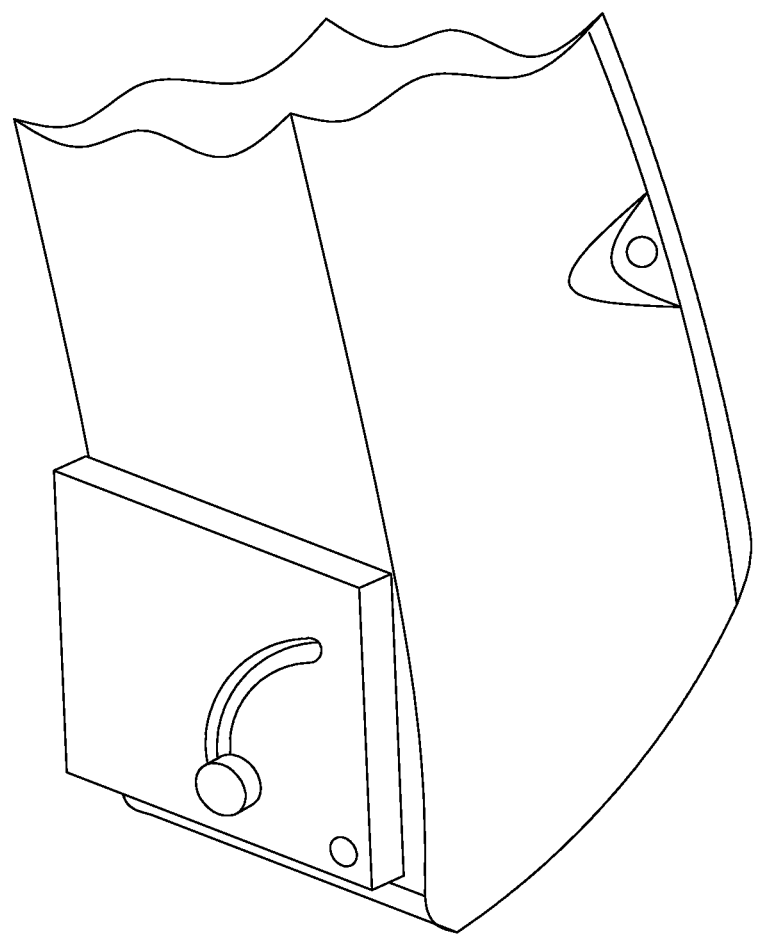
FIG. 4 illustrates a retracted mud flap of the fender flare in FIG. 1 in one example of the present disclosure.

Referring to FIGS. 1 and 4, mud flap 110 is pivotally secured by a fastener 124 to fender flare 100 in one example of the present disclosure. Mud flap 110 has a circular guide 126 that receives a pin 128 from fender flare 100 to guide the rotation of mud flap 110. When in use, mud flap 110 is rotated downward to extend it as shown in FIG. 1. When not in use, mud flap 110 is rotated upward to retract it as shown in FIG. 4.

Figure 5:
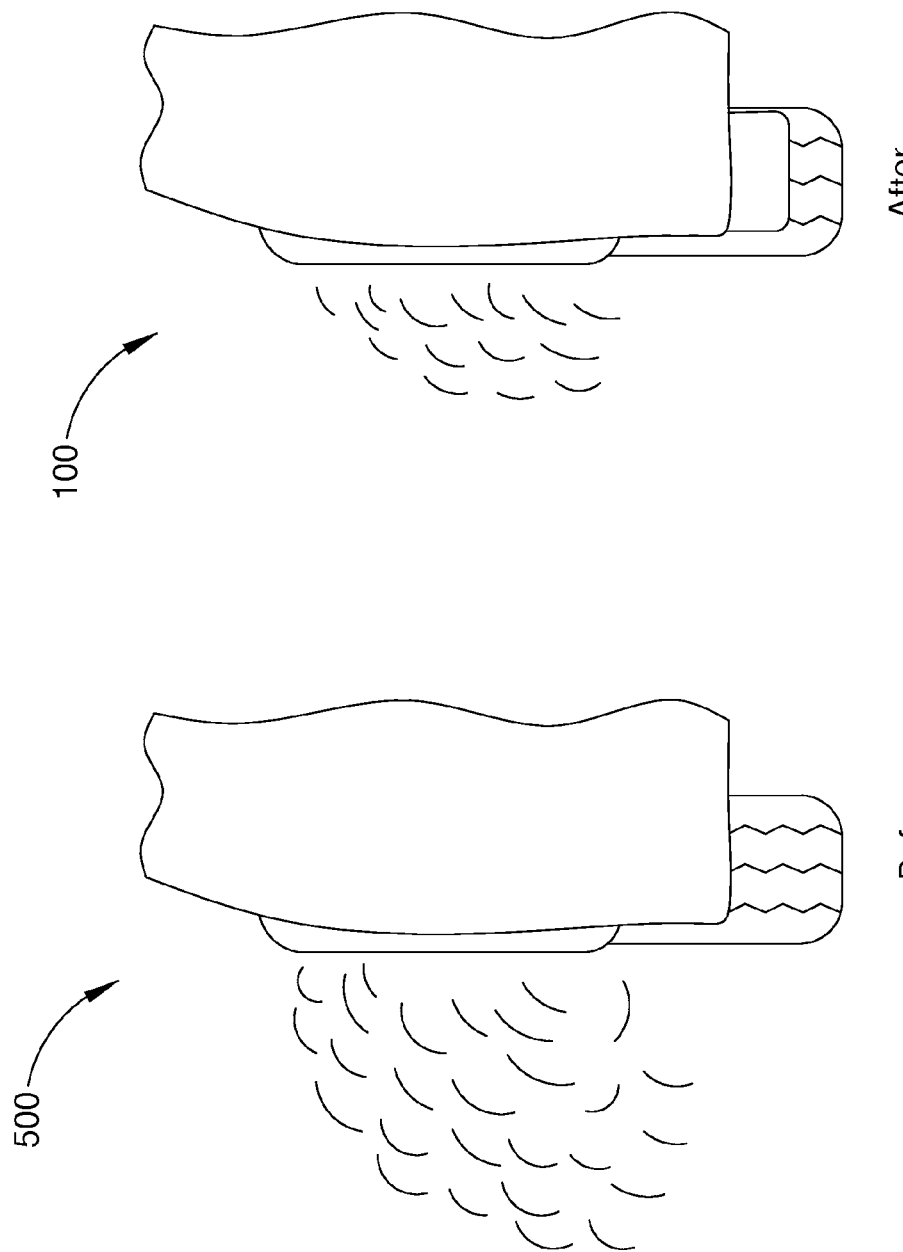
FIG. 5 illustrates a comparison between a conventional fender flare and the fender flare of FIG. 1 in one example of the present disclosure.

FIG. 5 illustrates a comparison between a conventional fender flare 500 and fender flare 100 in one example of the present disclosure. Due to features such as troughs 106, gutters 110, and mud flap 110, fender flare 100 reduces the water spray outward from the vehicle as compared to conventional fender flare 500.

Various other adaptations and combinations of features of the embodiments disclosed are within the scope of the present disclosure. Numerous embodiments are encompassed by the following claims.

What is claimed is:

1. A fender flare, comprising:
   a side portion; and
   an inner portion, comprising:
      troughs at a front area of the inner portion, wherein the troughs comprise stacked pockets with top openings and wedge-shaped profiles, each trough comprising (1) an upper inclined surface facing upward and defining a top opening and (2) a lower inclined surface facing downward, wherein the wedge-shaped profiles protrude outward from the inner portion.

2. The fender flare of claim 1, wherein each trough is orientated diagonally downward towards the inside of a wheel well.

3. The fender flare of claim 1, wherein the inner portion further comprises gutters at a top area of the inner portion.

4. The fender flare of claim 3, wherein the gutters comprise J-shaped channels.

5. The fender flare of claim 4, wherein from its front to its back, each gutter is oriented diagonally inward towards the inside of a wheel well.

6. The fender flare of claim 1, wherein:
   the side portion is substantially parallel to a wheel well; and
   the exterior side is substantially parallel to a side of a fender.

7. The fender flare of claim 1, wherein the inner portion further comprises a mud flap at a back area of the inner portion, wherein:
   the mud flap is pivotally secured by a fastener to the fender flare; and
   the mud flap defines a circular guide that receives a pin from the fender flare to guide a rotation of the mud flap.

8. A fender flare, comprising:
   a side portion; and
   an inner portion, comprising:
      troughs at a front area of the inner portion; and
      a mud flap at a back area of the inner portion, wherein:
         the mud flap is pivotally secured by a fastener to the fender flare; and
         the mud flap defines a circular guide that receives a pin from the fender flare to guide a rotation of the mud flap.

9. The fender flare of claim 8, wherein the side portion comprises lights along its perimeter.

\* \* \* \* \*